US010218531B2

(12) United States Patent
Roosli

(10) Patent No.: US 10,218,531 B2
(45) Date of Patent: *Feb. 26, 2019

(54) AUTOMATION SYSTEM FOR DEPLOYMENT IN A BUILDING

(71) Applicant: Philipp Roosli, Niantic, CT (US)

(72) Inventor: Philipp Roosli, Niantic, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/836,526

(22) Filed: Dec. 8, 2017

(65) Prior Publication Data

US 2019/0020495 A1   Jan. 17, 2019

Related U.S. Application Data

(60) Provisional application No. 62/530,902, filed on Jul. 11, 2017.

(51) Int. Cl.
*G05B 15/02* (2006.01)
*H04L 12/28* (2006.01)
*H05B 33/08* (2006.01)
*G06K 9/00* (2006.01)
*H05B 37/02* (2006.01)
(Continued)

(52) U.S. Cl.
CPC ........... *H04L 12/282* (2013.01); *G05B 15/02* (2013.01); *G06K 9/00335* (2013.01);
(Continued)

(58) Field of Classification Search
CPC .......... G05B 15/02; G05B 2219/25167; G05B 2219/2642; G06F 11/0793; G06F 21/6218;
(Continued)

(56) References Cited

U.S. PATENT DOCUMENTS 8,635,338 B2 * 1/2014 McCoy ............... G05B 15/02
709/224
9,661,120 B1   5/2017 Skeffington et al.
(Continued)

OTHER PUBLICATIONS

Govindraju, "Sensing Location: Occupancy Sensor Data Driven Automatic Determination of Sensor Locations in Buildings", Delft University of Technology Master's Thesis in MSc Embedded Systems, 2016, 70 pages.
(Continued)

*Primary Examiner* — Chun Cao
(74) *Attorney, Agent, or Firm* — Cantor Colburn LLP

(57) ABSTRACT

An automation system for deployment in a building with rooms is provided. The automation system includes a server and an electronic device cluster in each room. Each electronic device cluster includes electronic devices of which at least one is configured to sense a condition within the room and at least one is configured to report sensing results to the server. Room locations of the electronic device clusters are undefined for the server at an initial time. The server is receptive of the sensing results from the at least one electronic device in each electronic device cluster in each room and external information. The server is configured to compare the received sensing results with the external information, iteratively determine the room locations of one or more of the electronic device clusters from comparison results and communicate with at least one of the electronic devices of the one or more of the electronic device clusters based on iteratively determined room locations.

4 Claims, 12 Drawing Sheets

(52) U.S. Cl.
CPC ..... G06K 9/00691 (2013.01); H05B 33/0845 (2013.01); *G05B 2219/2642* (2013.01); *H05B 37/0227* (2013.01)

(58) Field of Classification Search
CPC .............. G06F 3/0484; G06F 11/3409; G06F 11/3452; G06F 21/52; G06F 9/4443; G06F 9/451; H04L 12/282
USPC .......................................................... 700/275
See application file for complete search history.

(56) References Cited

U.S. PATENT DOCUMENTS

| | | | |
|---|---|---|---|
| 2009/0045939 A1* | 2/2009 | Holland | H04W 24/00 340/524 |
| 2010/0141602 A1* | 6/2010 | Duchene | G05B 19/042 345/173 |
| 2010/0228805 A1* | 9/2010 | McCoy | G05B 15/02 702/187 |
| 2013/0219034 A1* | 8/2013 | Wang | H04L 12/2809 709/222 |
| 2016/0070276 A1 | 3/2016 | Joshi et al. | |
| 2016/0195864 A1 | 7/2016 | Kim | |
| 2017/0187807 A1 | 6/2017 | Clernon | |
| 2018/0083916 A1* | 3/2018 | Xu | H04L 47/13 |
| 2018/0197116 A1* | 7/2018 | Carru | G06Q 10/02 |

OTHER PUBLICATIONS

Hong, et al., Towards Automatic Spatial Verification of Sensor Placement in Buildings, ACM 2013, 8 pages.

* cited by examiner

FIG. 1A

| RID=201 CID=C₂₀₁ | RID=202 CID=C₂₀₂ | RID=203 CID=C₂₀₃ |
| --- | --- | --- |
| RID=101 CID=C₁₀₁ | RID=102 CID=C₁₀₂ | RID=103 CID=C₁₀₃ |

FIG. 1C

| Room Identifier | | | | | | | |
|---|---|---|---|---|---|---|---|
| 101 | 16.7% | 16.7% | 16.7% | 16.7% | 16.7% | 16.7% | Σ=100% |
| 102 | 16.7% | 16.7% | 16.7% | 16.7% | 16.7% | 16.7% | Σ=100% |
| 103 | 16.7% | 16.7% | 16.7% | 16.7% | 16.7% | 16.7% | Σ=100% |
| 201 | 16.7% | 16.7% | 16.7% | 16.7% | 16.7% | 16.7% | Σ=100% |
| 202 | 16.7% | 16.7% | 16.7% | 16.7% | 16.7% | 16.7% | Σ=100% |
| 203 | 16.7% | 16.7% | 16.7% | 16.7% | 16.7% | 16.7% | Σ=100% |
| Cluster ID | C101 | C102 | C103 | C201 | C202 | C203 | |
| | Σ=100% | Σ=100% | Σ=100% | Σ=100% | Σ=100% | Σ=100% | |

FIG. 1D

| | Room Identifier | | | | | | |
|---|---|---|---|---|---|---|---|
| | 101 | 102 | 103 | 201 | 202 | 203 | |
| C102 | 0% | 100% | 0% | 0% | 0% | 0% | Σ=100% |
| C201 | 0% | 0% | 0% | 97% | 0% | 3% | Σ=100% |
| C202 | 100% | 0% | 0% | 0% | 100% | 0% | Σ=100% |
| C101 | 0% | 0% | 0% | 0% | 0% | 0% | Σ=100% |
| C103 | 0% | 0% | 100% | 0% | 0% | 0% | Σ=100% |
| C203 | 0% | 0% | 0% | 3% | 0% | 97% | Σ=100% |
| Cluster ID | Σ=100% | Σ=100% | Σ=100% | Σ=100% | Σ=100% | Σ=100% | |

FIG. 4

| | 101 | 102 | 103 | 104 | 201 | 202 | 203 | ... | 503 | 504 |
|---|---|---|---|---|---|---|---|---|---|---|
| 101 | - | 97% | 71% | 42% | 56% | 50% | 37% | | 1% | 1% |
| 102 | 97% | - | 97% | 71% | 50% | 56% | 50% | | 1% | 1% |
| 103 | 71% | 97% | - | 97% | 37% | 50% | 56% | | 1% | 1% |
| 104 | 42% | 71% | 97% | - | 24% | 37% | 50% | ... | 1% | 1% |
| 201 | 56% | 50% | 37% | 34% | - | 97% | 71% | | 2% | 2% |
| 202 | 50% | 56% | 50% | 37% | 97% | - | 97% | | 3% | 2% |
| 203 | 37% | 50% | 56% | 50% | 71% | 97% | - | | 3% | 3% |
| ⋮ | ⋮ | | | ⋮ | | | | | ⋮ | |
| 503 | 1% | 1% | 1% | 1% | 2% | 3% | 3% | ... | - | 97% |
| 504 | 1% | 1% | 1% | 1% | 2% | 2% | 3% | | 97% | - |

Transmitting Room (rows) / Receiving Room (columns)

FIG. 6

| Room M \ Room N | 101 | 102 | 103 | 104 | 201 | 202 | 203 | ... | 503 | 504 |
|---|---|---|---|---|---|---|---|---|---|---|
| 101 | - | 100% | 100% | 100% | 0% | 0% | 0% | | 0% | 0% |
| 102 | 100% | - | 100% | 100% | 0% | 0% | 0% | | 0% | 0% |
| 103 | 100% | 100% | - | 100% | 0% | 0% | 0% | | 0% | 0% |
| 104 | 100% | 100% | 100% | - | 0% | 0% | 0% | ... | 0% | 0% |
| 201 | 0% | 0% | 0% | 0% | - | 100% | 100% | | 0% | 0% |
| 202 | 0% | 0% | 0% | 0% | 100% | - | 100% | | 0% | 0% |
| 203 | 0% | 0% | 0% | 0% | 100% | 100% | - | | 0% | 0% |
| ... | | | | | | | | | | |
| 503 | 0% | 0% | 0% | 0% | 0% | 0% | 0% | | - | 100% |
| 504 | 0% | 0% | 0% | 0% | 0% | 0% | 0% | | 100% | - |

AUTOMATION SYSTEM FOR DEPLOYMENT IN A BUILDING

BACKGROUND

This disclosure relates to an automation system and, more particularly, to an automation system for deployment in a building.

In multi-room buildings, each room often has devices such as thermostats, light switches, controllers, etc. installed therein. Recently, as it has become possible to provide such devices with high performance micro-processors and networking capabilities and as the Internet of Things (IoT) has become more popular and desired, many buildings have begun upgrading their systems. Thus, hotels, dormitories, senior living facilities, hospitals, office buildings and so on now have systems of high performance and networked electrical devices installed in their respective rooms.

When such networked systems are provided in a building, the installer needs to configure each electrical device for each room so that each electrical device is associated with a corresponding room identifier. This way, data capturing and control with respect to the electrical devices from remote locations is fully and properly enabled. For example, if networked thermostats are installed in a building with three rooms, the networked thermostats need to be configured with their correct room addresses so that, if a remote user wants to change the temperature in only room #2, only the thermostat in room #2 will perform this command with the other thermostats remaining unaffected. Similarly, if the thermostat in room #3 detects a fault condition for cooling the room, then the alarm should be associated with only that room so that the service engineer is not sent to the incorrect room.

To configure the room identifiers, various systems offer different options. Some equipment can be put into a service mode where the installer can enter the room identifier in one of the service pages. In other cases, the installer uses a tool, such as a tablet, laptop or proprietary handheld device to program the room identifier into the device. In other systems, the electrical devices include dip-switches that allow the installer to set an identifier. Regardless of the selected technology, this is a manual process and fraught with costs and risks.

Therefore, a first issue often arises during the initial installation. Typically for larger installations, trained installers handle the deployment of equipment but because they visit many rooms in a relatively short time period and though the installers might be very experienced, they often rush through the process and make mistakes. For example, after installing equipment on a $4^{th}$ floor of a building and then starting to install equipment on the $5^{th}$ floor, the installer might still think he is on the 4th floor and assign $4^{th}$ floor room identifiers to the $5^{th}$ floor equipment or he may simply swap one room's equipment for another. Even if the installer completes the installation correctly, another person might move equipment around without correcting the configurations.

Additional issues are encountered once a building has been handed over to the operator and system maintenance takes over. Here, failed equipment often needs to be replaced and spare parts need to be properly configured to assure the configuration integrity of the system. During this phase, the person who needs to perform these operations is often not well trained, might have little experience and sometimes lacks the motivation to do the task properly. It also is quite a common occurrence that if equipment fails, equipment from other rooms is "borrowed" as a short-term fix and later the donating room gets new equipment. This procedure opens the door to where configured devices move to a new location and are not properly adapted to their new home.

The combined effects of these issues continuously and gradually lead to degradation of systems.

BRIEF DESCRIPTION

According to an aspect of the disclosure, an automation system for deployment in a building with rooms is provided. The automation system includes a server and an electronic device cluster in each room. Each electronic device cluster includes electronic devices of which at least one is configured to sense a condition within the room and at least one is configured to report sensing results to the server. Room locations of the electronic device clusters are undefined for the server at an initial time. The server is receptive of the sensing results from the at least one electronic device in each electronic device cluster in each room and external information. The server is configured to compare the received sensing results with the external information, iteratively determine the room locations of one or more of the electronic device clusters from comparison results and communicate with at least one of the electronic devices of the one or more of the electronic device clusters based on iteratively determined room locations.

In accordance with additional or alternative embodiments, the sensed condition includes an occupancy state of the room, a lighting condition within the room, an environmental condition within the room, energy usage within the room, water usage within the room, audio/visual purchases within the room and minibar consumption within the room.

In accordance with additional or alternative embodiments, the external information includes a type of the room, a rental state of the room, and a characteristic of an individual associated with the room.

In accordance with additional or alternative embodiments, the server iteratively determines the room locations based on a correlation between the sensing results and the external information.

In accordance with additional or alternative embodiments, the server executes iterative determination of the room locations by generating an address translation table correlating iteratively determined room locations with logical addresses of the electronic devices of the one or more of the electronic device clusters.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 1A shows a simple two-dimensional lattice grid of rooms belonging to a room automation system with each room showing their logical room identifier and their cluster identifier;

FIG. 1C shows an initial cluster-to-room binding likelihood table;

FIG. 1D shows an advanced cluster-to-room binding likelihood table at a nearly fully converged state;

FIG. 4 shows an RF packet reception probability between a transmitting and receiving room based on an in-door RF path loss model;

FIG. 6 shows a matrix that represents the grouping of rooms in a wired network;

Figure 1B:
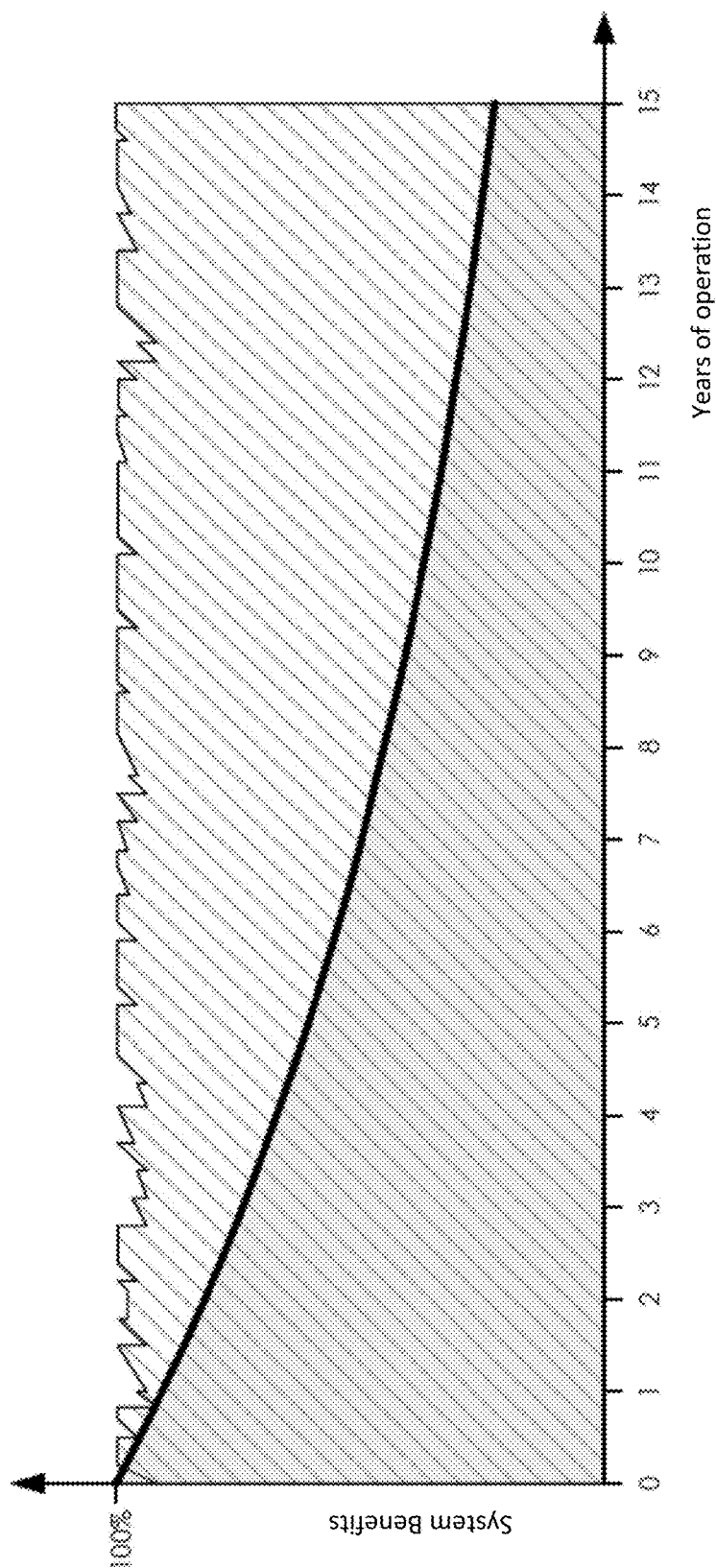
FIG. 1B compares the system benefits of a system that has a gradually deteriorating configuration integrity versus a system that has a self-healing system integrity.

These and other advantages and features will become more apparent from the following description taken in conjunction with the drawings.

DETAILED DESCRIPTION

The following description relates to room automation systems that do not require the manual assignment of a room identifier to electrical equipment in each room in a building. The room automation systems use regression analysis of variables that can be predicted for each room with variables that can be measured at the room in order to assign the room identifier automatically. Spatial information of the rooms and network topology of wiring can be further utilized to speed-up the process of assigning room identifiers and at the same time reduce the overall number of mistakes in such configurations. Lastly, the assigning of room identifiers can be greatly sped-up through a process of elimination.

The following description also relates to the continuous monitoring of elements of room automaton systems, whereby configuration mistakes can be detected and automatically corrected. In contrast to manually maintained systems where the configuration integrity tends to only get worse over time, the room automation systems described herein are characterized by increased configuration integrity over time.

The following description also relates to the assignment of a correct logical room identifier to the equipment that is a part of a room automation system regardless of its topology. This process is referred to as "room binding."

With reference to FIG. 1A, a room automation system is provided in a hotel, dormitory, senior living facility, hospital, an office building or a similar building. In FIG. 1A, six rooms are arranged as three rooms on two floors. The rooms are enumerated with the lower order digits being the room number along a hallway and the highest order digit identifying the floor on which the room is located. While, the enumeration scheme is exemplary and any enumeration scheme will work, it is to be understood that a building can have many rooms and that these rooms can be represented easily in a spatial representation, such as in a 2D grid or in a 3D drawing.

Each room contains room automation equipment. This can be a simple single device, such as a thermostat, or a complex controller that manages the entire room, or a set of devices that form a distributed control system. An example of a distributed control system is a set of smart light switches, thermostats, dimmer controllers, drapery controllers, motion sensors and other sensors. The term "cluster", "room cluster" or "electronic device cluster" will be used hereinafter to refer to the one or more electronic devices in each room in the room automation system as a singular managed entity.

A typical room automation system has two addresses for each room and cluster. The first address may be a logical room identifier (RID). The RID is a system unique identifier that is easy to work with by a human. For example, the RID for room 102 could be "102". Alternatively, it can be set to "Josephine's room" or "Library 3". The second address is the cluster identifier (CID). The CID is a unique identifier of the room automation equipment installed in the room. The CID could be for example the IEEE MAC address of the device(s), a unique serial number and so on. The CID is typically set at the time of equipment manufacturing but can also be generated on the fly during the installation. The CID may generally be a unique but largely random number. For example, the CID for room 201 (C201 in FIG. 1A) could be 03:F7:22:18:FF:E3.

The typical functions of a networked room automation systems are that the room status information can be logged and the parameters in the room can be controlled. For example, the system objective is to track measured room temperature, target temperature, heating and cooling demand and fault conditions. A simple example of a control function is that the building operator might want to change the target temperature in a room from a remote console or he might want to control the lights in yet another room. In the case when we have multiple rooms, it is mandatory that we have a proper room address configuration. If one room reports a problem with cooling, then this information is much more valuable if we know that this is the case in room 102 and the other rooms do not have this issue. This piece of information allows the building operator to fix issues much more efficiently but requires that the equipment in room 102 be associated with the logical RID=102. In conventional systems, this association is achieved manually and prone to errors (e.g., the RID is configured into the equipment of the room or the CID can be captured and a network address translation table can be manually setup at the router or the server to bi-directional lookup the RID based on the CID or vice versa).

The benefits of a properly configured address scheme are clear. In a hotel, a property management system sends a rental status to the room automation system. If a room is rented, the room automation system will control the temperature in the rented room to remain in a comfortable range in order to provide the guest with a pleasant stay. If the room is not rented, the temperature control in the room is curtailed in order to conserve energy. However, if the rental state of a room is sent to an incorrect room, the room automation system might control the temperature in the wrong room and the hotel operator might need to contend with unhappy guests as they complain of not being comfortable. Further, expected energy conservation goals will not be met either.

In reality, the configuration in buildings tends to naturally deteriorate. Multiple factors contribute to this observation. For example, if a problem arises in a room, equipment from a different working room is often dispatched to the faulty room so that the issue can be resolved quickly. Later, the donating room will be repaired. Often during these type of operations, the configuration is neglected to be properly set. Also, any incorrect configuration operation during the maintenance phase of the building is often difficult to detect or the issue of configuration integrity is plainly ignored by the building operator because of resource constraints. Another contributing factor is the possible lack of training due to personnel fluctuations. Yet another contributing factor is the aging of technology. In the fast-paced world of the Internet of Things (IoT), systems installed just five years ago might appear arcane and the maintenance procedures and tools can be seen as old fashioned and alien. All these effects lead to the above-mentioned gradual deterioration of configuration integrity and with it the system gradually loses its expected benefits. This effect is visualized in FIG. 1B where the loss of system benefits is modeled as an exponential decay function. The gray area below the exponential decay function is the total benefit that accrues over a life span of 15 years.

A system that can monitor its configuration integrity and self-correct mistakes would thus avoid the above-mentioned issues. This is shown in FIG. 1B in the hashed area of benefits over the same life span as before. We can still see the occasional detrimental effects that attempt to bring down the system performance, but we also see how the system auto-corrects to provide for a built-in resilience.

The approach to achieve automatic tracking of configuration integrity and the possibility to automatically correct configuration mistakes are demonstrated in FIGS. 1C and 1D. In FIG. 1C, we see the starting point of a six room building where the room identifier is not manually configured. The six rooms {101, 102, 103, 201, 202, 203} each have been equipped with a room automation system. Each of these room automation systems contains a cluster identifier Cx that has no resemblance with the room where the equipment is installed. So, as the data flow arrives from the six rooms, we can keep track of the six room automation systems by their cluster identifier but the system has no idea with what rooms these clusters are associated. Without any information, any cluster can be present in any room with the same likelihood. And vice versa, any room can contain any cluster with the same likelihood. This is shown as the starting point in FIG. 1C in that every possible combination has an equal likelihood of 16.7%.

However, to the extent that information receives from the clusters can be correlated with information known about rooms, a gradual stream of supporting and denying pieces of information can increase and decrease the likelihood of a particular cluster being located in a particular room. For example, in a hotel, it is rather less likely that an unrented room encounters occupancy triggers or air conditioning setpoint changes in the middle of the night. In an office building, the arrival of a particular employee will correlate with events such as the lights in his office being controlled. Through an iterative process where the a-priori cluster-to-room likelihoods are updated with continuously established new information gleaned from these types of correlations, the binding matrix will gradually adjust its values and the likelihood table will, over a period of time, approximate the true and correct binding information. FIG. 1D shows such an advanced stage cluster-to-room likelihood table where in essence each cluster is bound to a single room and where each room has a single assigned cluster. In the provided example, while there is still a residual uncertainty which of the two clusters C201 and C203 belong to rooms 201 and 203, further iterations will continue to provide hardening information that will eventually clarify this uncertainty.

The approximation process may be based on iterative correlation methods but it can take a relatively long time for the binding likelihoods to converge on stable and correct data points. Especially in large buildings with hundreds of rooms, the iterative correlation approach can take many weeks if not months to properly converge. To speed-up the correlation, a second stage of groupings can be appended to the algorithm. This will be explained in greater detail below but, in summary, a simple example will be provided here. If it is known that rooms 101, 102 and 103 form a group and we have a group of three clusters with CIDs C1, C2 and C3 where room 101 has excellent correlation with C1 and room 102 has excellent correlation with C2 then through a process of exclusion it can be known that C3 must therefore be bound with room 103 even if C3 has other reasonable correlations with other rooms. Such groups can be formed by network wires which in this example would suggest that the stated rooms are connected and that the stated clusters report on the same network. Other groups can be formed through spatial proximity, such as if C3 can be shown to be close to the room that correlates extremely well with rooms 101 and 102 but far away from a room that would have correlated with C3 as well.

The iterative correlation method will now be described. Initially, a default cluster-to-room likelihood table is provided as shown in FIG. 1C. Going forward, the cluster-to-room likelihood table will be referred to as the "CR-matrix". The initial state of the CR-matrix is that all clusters are equally likely to be bound to all the available rooms. As the system generates observation patterns based on collected and sensed information, the initial state will be gradually adapted to find the correct solution to the cluster-to-room binding. The mathematical functions are based on Bayes' theorem (sometimes also referred to as Bayes' law and Bayes' rule), hidden Markov models, Kalman filters and broadly dynamic Bayesian networks. These are general tools used by artificial intelligence as part of probabilistic reasoning over time and the inference in temporal models.

This is best explained with an example. A hotel with n rooms that are serviced by n room automation clusters is provided. On most days, staff members are not present in any rooms between the night hours of 9 pm and 7 am. A set of attributes is received from each cluster with one attribute relating to whether a user present in the room operated any lights during the period in question. While it cannot be directly known whether the user that executed the operation is a staff member or a guest, it can be inferred that the user is a guest because the observation period is limited to the night hours. Here, one cluster N1 reports that a light was operated at 11 pm and a second cluster N2 reports no lights were operated during the 9 pm to 7 am interval and the system receives a feed from the property management system which states what room is rented at what time during the observation period.

As a first step, Bayes' theorem is applied. Through data analytics (for example from other properties), it can be known that if a room is rented, 97% of all guests would interact with the lights during the stated hours and 3% would not. It can also be known that in only 1% of all cases, such an interaction can be observed in an unrented room. Operating lights in unrented rooms can be caused by the fact that sometimes the information of the property management system might be faulty or because of an exceptional circumstance when a staff member was visiting an unrented room in the middle of the night.

In Table 1, the notation of how heuristic information is expressed is shown. This is called a conditional probability and relates the Bayes' theorem.

TABLE 1

P (light operation | room rented) = 0.97
P (light operation | room unrented) = 0.01

TABLE 2

Room=rented, cluster=light operation
$P(RC)_{n+1} = P(RC)_n$ * P(light operation | room rented) * Rooms / Cnt(Rented)
Room=unrented, cluster=light operation
$P(RC)_{n+1} = P(RC)_n$ * P(light operation | room unrented) * Rooms / Cnt(Rented)
Room=rented, cluster=no light operation
$P(RC)_{n+1} = P(RC)_n$ * (1 - P(light operation | room rented)) * Rooms / (Rooms - Cnt(Rented))
Room=unrented, cluster=no light operation
$P(RC)_{n+1} = P(RC)_n$ * (1 - P(light operation | room unrented)) * Rooms / (Rooms - Cnt(Rented))
Cnt(Rented) = number of rooms reported as rented
Rooms = total number of rooms of the system Moving to Table 2, the fields in the CR-matrix are updated as part of an iterative process that is applied for a particular heuristic. Four possible combinations of rented and unrented rooms are possible with various clusters reporting a light operation or no light operation. An existing likelihood state of an intersection room/cluster with a current binding likelihood of P(RC) is recomputed. There is however an issue with performing this operation with the initial heuristic a-priori values provided in Table 1. When the operation is performed as outlined, then the sum of the row will remain 100% but the sum of the columns will no longer be 100%. This is caused by the fact that the given likelihood of the event (in this case operating a light) is in actuality a random variable. As a simple example, in a one-thousand room hotel that is 100% rented and with the given 97% utilization likelihood, it would be expected that exactly nine hundred and seventy light operations would be reported but only nine hundred and fifty operations might actually be reported. Thus, while the initial 97% assumption may have been a good starting point, the value might need to be adjusted with information that can be gleaned from the data stream itself. This becomes somewhat more difficult in the following situation: if the same hotel has eight hundred rented rooms (predicate) and only seven hundred and forty light operations are observed. In this case, how many that can be attributed to the rented rooms versus the unrented rooms requires a full joint probability distribution. This requires the computation of combinatorial quantities that, with buildings where room numbers are high, can easily lead to numerical overflows for a standard floating-point capabilities of regular software programming environments.

In Table 3, source code to convert a-priori conditional probabilities for a particular predicate/event observation is shown. The source code has been structured in a manner that avoids the computation of large factorials so that numerical overloads can be avoided.

TABLE 3

```
public class BayesLib
{
  public static void Normalize(ref BayesBinary BB, uint N,
uint CntPrep, uint CntEvents)
  {
    if ((CntPrep > N) || (CntEvents > N)) return;
    uint CntNotPrep = N - CntPrep;
    uint CntNotEvents = N - CntEvents;
    uint IterA = CntEvents;
    uint IterB = 0;
    if (IterA > CntPrep)
    {
      IterA = CntPrep;
      IterB = CntEvents - CntPrep;
    }
    double SumParts = 0.0;
    double SumPrep = 0.0;
    double SumNotPrep = 0.0;
    while ((IterB <= CntNotPrep))
    {
      if (IterA <= CntPrep)
      {
        double CombA = PascalNK_P(CntPrep, CntPrep - IterA, 1.0 - BB.P Prep Event);
        double CombB = PascalNK_P(CntNotPrep, CntNotPrep - IterB, 1.0 - BB.P_NotPrep_Event);
        double MulAB = CombA * CombB;
        SumParts += MulAB;
        SumPrep += IterA * MulAB;
        SumNotPrep += IterB * MulAB;
      }
      IterB++;
      IterA--;
    }
    BB.P_Prep_Event = (SumPrep / SumParts) / CntPrep;
    BB.P_NotPrep_Event = (SumNotPrep / SumParts) / CntNotPrep;
    if (double.IsNaN(BB.P_Prep_Event)) BB.P_Prep_Event = 0.0;
    if (double.IsNaN(BB.P_NotPrep_Event))
BB.P_NotPrep_Event = 0.0;
  }
  public static double PascalNK (uint N, uint K, double P)
  {
    double Val =1.0;
    for (uint i = 0; i < K; i++)
    {
      Val =Val * (N – i) / (i +1) * P;
    }
    return (Val);
  }
}
public class BayesBinary
{
  public double P_Prep_Event;
  public double P_NotPrep_Event;
}
```

TABLE 4

```
BayesBinary BayesBinaryEvent = new BayesBinary ( );
BayesBinaryEvent.P_Prep_Event = 0.97;
BayesBinaryEvent.P_NotPrep_Event = 0.01;
BayesLib.Normalize(ref BayesBinaryEvent, 1000, 800, 740);
```

In Table 4, an example of how the source code of Table 3 can be used is shown. An event likelihood is initialized (97% for operating a light) for a room that has an active predicate (in this case a room with a rental state state). Similarly, an event likelihood is initialized to 1% for the room with an inactive predicate (in this case, a room that has its rental state cleared). The call to the "Normalize" function states that a one thousand room building with eight hundred active predicate rooms (rented rooms) has received seven hundred and forty events (light operations). The output is contained in the same BayesBinaryEvent variable where the two likelihood fields have been updated with the joint probability formula of Table 3.

We have seen how we can utilize the operation of the lights in room automation systems and the rental status of rooms to iteratively approximate and eventually converge on the correct association between a room automation cluster and a room. The more heuristics are available, the faster we can converge towards the correct solution. The limit of the light control heuristic is that we can only apply it once per day. In the morning hours, we can check if the lights were operated during the previous night and run that through the CR-matrix. However, we can augment this heuristic with other known patterns and run them as well.

For example, we can claim that the number of thermostat operations in the rooms at night differ for rented and unrented rooms. Door opening patterns during the night contrasted with the rental status is yet another attribute that can be used to run the iterative algorithm. Another element is room occupancy. Again, a room is more likely to be occupied at night if the room is rented versus unrented. If a room automation system can report the staff access credential identifier when the staff member enters the room, and this information can be triangulated against the rooms the staff member is supposed to visit that day, we have a very strong set of variables that can twist the CR-matrix table in the right direction. An even stronger set of variables relies on guest access control codes as they are typically assigned to only a single room at a single time. The opening of the minibar door as observed by the room automation cluster and a room list of minibar billing is yet another dependency that can be harnessed. Another interesting dependency is the check-in event time compared with door openings as sensed by the room automation system. In many cases, when a room is checked-in, the guest walks to the room to deposit her bags. If for example room 102 is checked-in at 4 pm, then room automation clusters that have a door opening between 4 pm and 5 pm are more likely to be associated with room 102 than for example clusters that have no door opening during this stated period. Similarly, in an office environment, having an employee batch-in in the morning and align this with the time of day when the office lights are turned on will show a correlation.

While some of these mechanisms have very strong correlation and let the CR-matrix converge quickly, other heuristics are not very strong and it would take a long time to find a solution just based on these weaker heuristics. However, taking all available heuristics together allows one to obtain a fast and correct convergence.

It should be obvious that many more heuristics can be created based on correlations between attributes that can be sensed by a room control system and information that is externally available.

Figure 3:
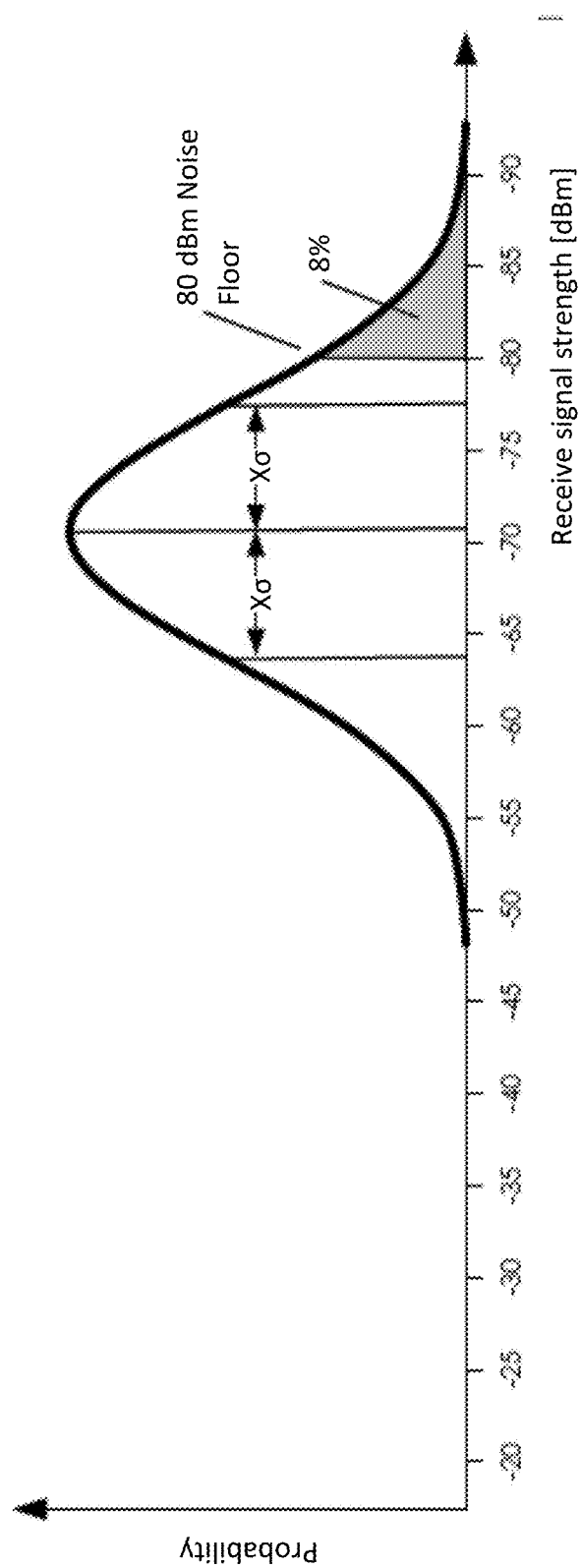
FIG. 3 shows a receive signal distribution example for a single radio link between the radios of two rooms.

So far, we have iterated all available heuristics into the CR-matrix and we should see a convergence towards a solution. As we iterate round after round, all available information is incorporated into the fields of the CR-matrix. If we would have run this for two years straight and were to exchange the hardware between two rooms, it would again take about two years to finally learn that the controllers have been changed. We can equate this to the statement that the system is slow in unlearning. This is of course not acceptable and we need to introduce a filter function to limit the history that can be accrued in the CR-matrix. So, instead of having a lossless iteration of the form:

$$P(RC)n+1 = P(RC)n * Q,$$

where Q is Bayes' theorem probability section as outlined in FIG. 3, we replace this formula with:

$$P(RC)n+1 = P(RC)n * ((kh-1) + Q)/kh,$$

where kh is the filter factor of a first order filter and the constant k should be set so that a proper trade-off can be found between convergence speed, predication quality and ability to adapt to changes in the configuration.

It is recommended that for different heuristics h, a different filter constant kh be made available. For example, having a heuristic that tends to deliver more noisy information, we want to consider increasing the k-constant for this heuristic as to slow-down the impact that this heuristic can have on the convergence. This equates as that such a heuristic has a lower priority in establishing the result.

For this purpose, alternative filters can of course be considered, such as a moving average filter.

The iterative update of the CR-matrix invariably leads to the correct solution but for systems with a large count of rooms, it can still take many rounds of iterations and it can take several months before a solution emerges. To speed-up this algorithm, we not only would like to create correlations one room automation cluster by each room, but if possible, we would like to use another method that is based on groups instead of individual rooms. For example, wired networks allow room automation clusters to form groups and if we know the rooms that are part of such networks, we can start to exclude many possible solutions in the CR-matrix through a process of elimination. Another form of grouping is spatial proximity of clusters that can be compared against spatial proximity of the rooms. Yet another group to segregate the solution tree may be based on room configurations and the type of devices of the room automation system and a corresponding list of room types that is part of the system design. An example of this category is that in a hospital, rooms on the $4^{th}$ floor are the pediatric ward and that all room automation systems on this floor contain a baby locator infrastructure. This means that if a baby monitor is part of the room automation cluster configuration, then all rooms that are not part of the $4^{th}$ floor cannot be associated with such a cluster. Yet another grouping might be based on the room control configuration parameter, such that an office for a single employee has a longer motion timeout to declare the room unoccupied as an office that is used by multiple employees. And yet another grouping could be achieved by the operational parameter that detects the time and intensity of natural light and compare this information against a list of rooms and their orientation towards the sun.

Figure 2:
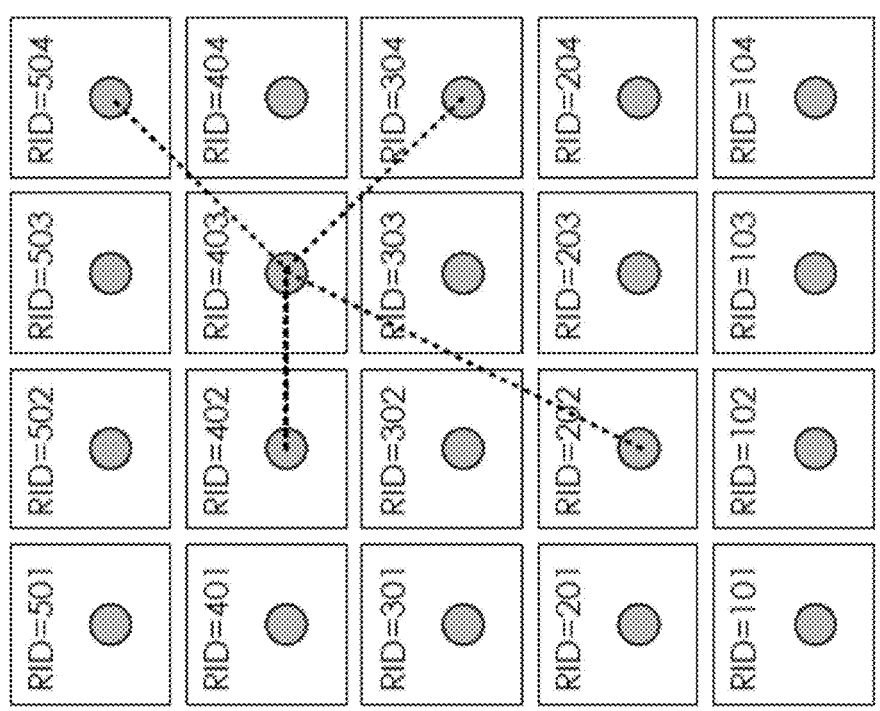
FIG. 2 shows a room lattice grid with the visualization of a number of wireless links between a selected room and other rooms.

In FIG. 2, a room automation system that uses a wireless network to communicate with the rooms is shown. Such wireless networks can be established with commercially available technology, such as WiFi, ZigBee, Z-Wave or Bluetooth but are not limited to the listed technologies. Some of these wireless technologies are based on a hub-and-spoke topology where each room will directly communicate with a router. In mesh networks, the rooms can communicate with the router either directly or by routing the data packets through one or multiple helper nodes. In most instances, these helper nodes are simply the other rooms but dedicated routing nodes can be introduced as well. Regardless of the selected network topology, each room has the opportunity to be in direct communication with other rooms. However, this direct communication might not possible between a selected room and any other room for the reason of distance or RF signal obstruction. For example, two rooms that are very far away from each other cannot communicate with each other because the signal between these rooms gets significantly attenuated. However, it is also possible that two rooms cannot communicate with each other directly even if they are very close. This could for example happen if an electrically conductive barrier, such as a metal door frame, absorbs the signal. Another impediment could be multi-path signal cancellations which particularly affects narrow-band wireless systems.

As shown in FIG. 2, direct wireless communication paths exist between a selected room 403 and its neighbors. In this example, room 403 can receive signals directly from rooms 504, 402, 304 and 202. It is demonstrated in this example that some rooms cannot be communicated with even though there are significantly closer in distance than other rooms. This needs to be understood by the empirically documented fact that the signal propagation within buildings has systemic impediments (building materials) but also some random contributing factors such as exact placement, changes to humidity, surface reflection and so on.

When room 403 receives the stated radio signals from other rooms, it can evaluate the signal strength of the incoming data stream. For example, if the signal is received with −35 dBm, it can be assumed that the respective transmitter is closer than a transmission from a different room that is being received with −60 dBm. The transmission of yet other rooms might be even weaker that produce a receive signal of say only −110 dBm. Such a signal cannot be received any longer if either the RF noise floor is stronger than the signal or if the receiver's signal sensitivity is insufficient.

In ideal free air systems with known transmit and receive antenna properties, the receiver signal strength is directly proportional to the distance between the transmit and receive antenna. The formula for a free air system's signal attenuation as a function of the distance is:

Path loss (dBm)=Path loss $(d0)+10*2.0*\log(d/d0)$.

In this formula, the expected path loss can be computed by the path loss at a reference distance d0 (such as one meter) and the actual distance d between the transmit and receive antenna.

However, in reality rooms are not part of a free air radio environment and have partitions such as floors, walls and obstructions such as furniture and people. Thus, it is often impractical to compute the path loss exactly for each radio link and a more practical approach evaluates path loss based on the indoor log-distance path loss model with the introduction of a random variable $X\sigma$:

Path loss (dB)=Path loss $(d0)+10*n*\log(d/d0)+X\sigma$, where n which the path loss exponent.

In free air, the path loss exponent is 2.0. The path loss exponent in buildings can vary, such as in a range between 1.6 and 6. Further, $X\sigma$ is a random signal attenuation variable assigned to each radio link between two rooms with a gaussian normal distribution with the standard deviation $\sigma$. In an example of an office environment with hard partitions for a 1500 MHz system where n is recommended to be set to 3.0, $X\sigma$ could be about 7.0.

The room location within a building is documented in building plans and the location of antennas in rooms is known to the installer as well. It is therefore a fairly straight forward process to assign spatial coordinates to a radio placed in each room. If we have for example two rooms, Rn and Rm, the equipment would be each placed at the specific spatial coordinates $\{Xn, Yn, Zn\}$ and $\{Xm, Ym, Zm\}$. The distance between these two antennas can be computed with the formula:

d (Distance $Rn-Rm$)=$\sqrt{[(Xn-Xm)2+(Yn-Ym)2+(Zn-Zm)2]}$.

Understanding the signal path loss in a building and having known spatial coordinates of RF equipment in a building, we can compute the expected signal strength probability distribution for each radio link. An example of this is provided in FIG. 3. With a given path loss model constants for n and $X\sigma$, and based on the computed distance, we can arrive at an expected signal strength that in the example is shown at −71 dBm. If we measure an RF signal noise floor of −80 dBm, we can compute that there is an 8% chance that the received signal will be weaker than the noise floor. Therefore, we have a 92% chance that the signal can be received.

Equipped with the ability to compute the likelihood that a room can receive a signal from another room, we can create a spatial connectivity probability table as outlined in FIG. 4. This results in a matrix with a column and row count that equates the number of rooms in the system. For all transmissions originating in an identified room, we can make a prediction with what likelihood any other room should be able to receive this very transmission. As the floor noise or the receive sensitivity changes for a particular room, the row in this table can be recomputed at any time to reflect the best possible estimation if data packets from other rooms should be received or not.

Figure 5:
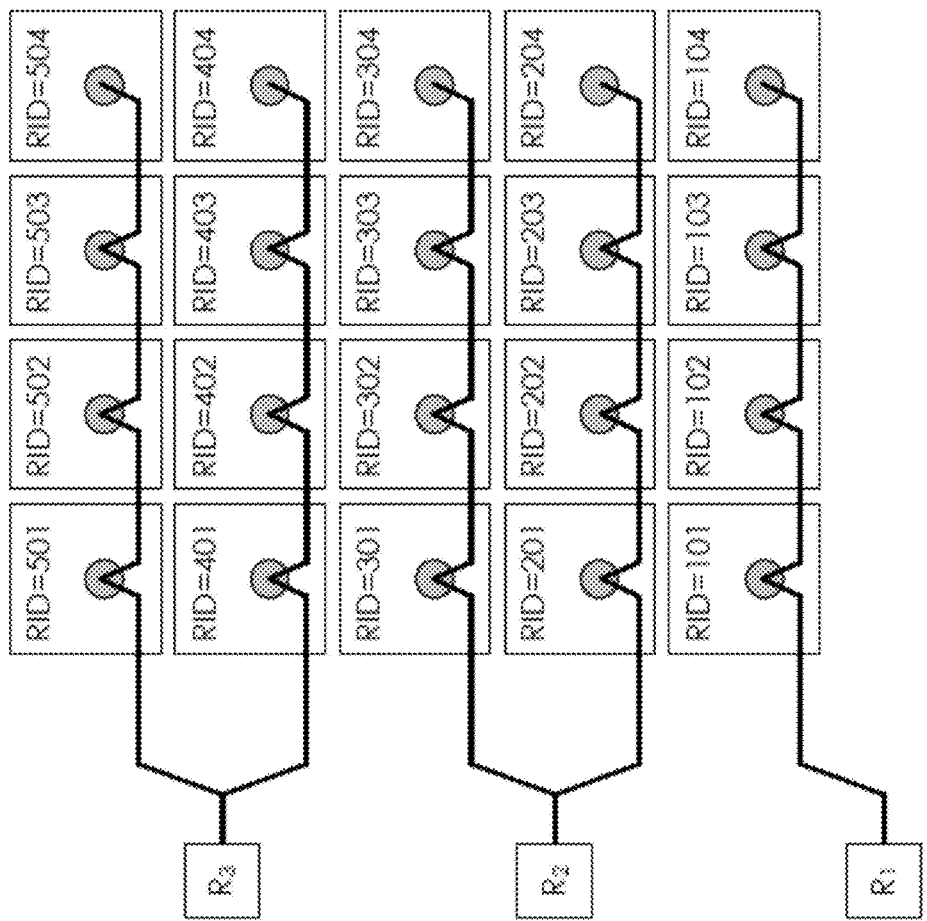
FIG. 5 shows a room lattice grid with a number of wired networks.

With reference to FIG. 5, we show again a building with a collection of rooms that are networked with a wired network. In this particular depiction, we have three routers R1 to R3 that service all rooms of this system. When such a network is being installed, it is a simple task to keep track of which router services which room. In this example, router #1 services the rooms on the first floor, while router #2 services floors 2 and 3 and finally router #3 services the rooms on floors 4 and 5. If the information of such wired networks is captured before or during the installation, then we can build the group sets rather easily has shown in Table 5.

TABLE 5

Group 1 = {101, 102, 103, 104}
Group 2 = {201, 202, 203, 204, 301, 302, 303, 304}
Group 3 = {401, 402, 403, 404, 501, 502, 503, 504}

Here, instead of a probability that can take any value between 0% and 100%, the hardwired networked solution yields a table that contains only the values of either 0% or 100%. A corresponding example is provided in FIG. 6. The question that this table can answer is the following: can a first room (Room N) be terminated on the same network as a second room (Room M)? If the answer is 100%, it means that they must be terminated on the same network router Rx (because that is how they were wired). If the answer is 0%, it means that the rooms cannot be terminated by the same network routers Rx.

Figure 7:
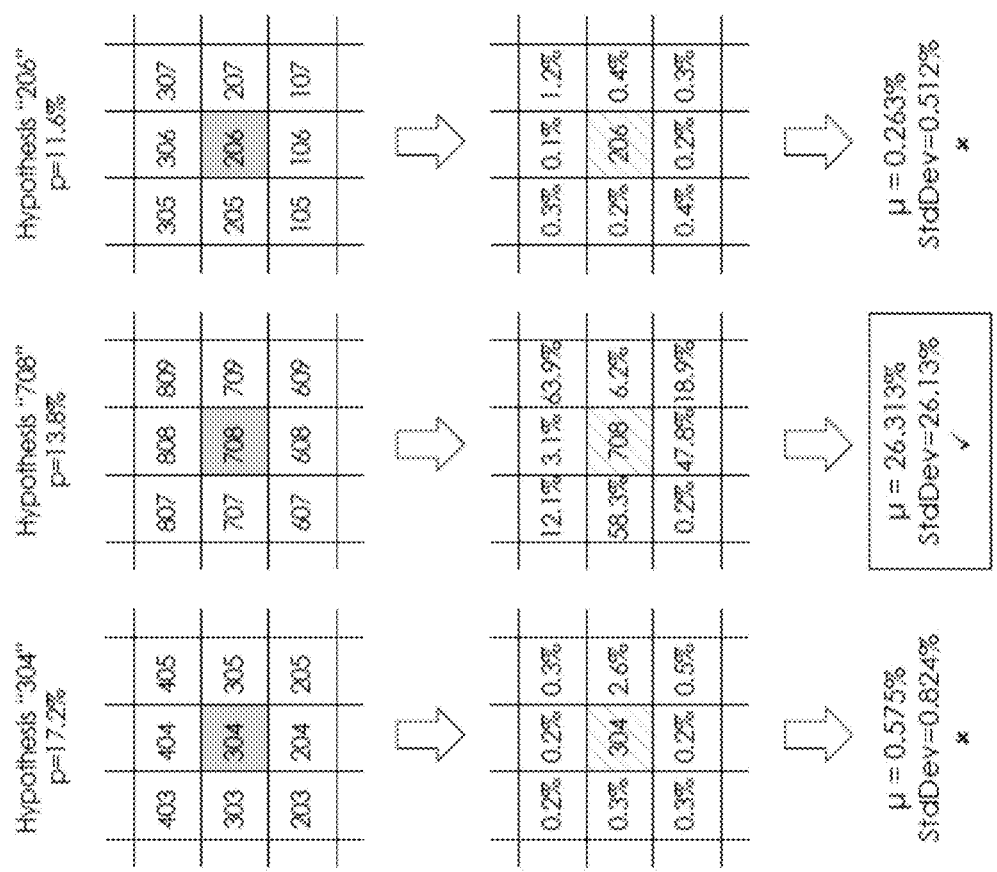
FIG. 7 shows a hypothesis of multiple rooms possibly associated with a cluster and the method to accept and discard hypotheses.

FIG. 7 illustrates how to make use of grouping information. We assume that we have a wireless network with 450 rooms. We start by running the CR-matrix for a few rounds with the iterative correlation algorithm as outlined earlier. For a particular cluster Cx, most associations with the rooms are very low but three peaks stand out, namely a 17.2% likelihood with room 304, a 13.8% likelihood with room 708 and a 11.6% likelihood with room 206. The remainder of the likelihood 100.0%−17.2%−13.8%−11.6%=57.4% is somewhat evenly split across all the remaining rooms and is fairly low. Further, the cluster Cx is receiving signals from 13 other clusters that build a neighbor set of {C1, C2, C3, . . . , C12, C13} for cluster Cx.

Is it possible to take these three hypotheses of rooms 304, 708 and 206 to be associated with, or to be eliminated from, Cluster Cx? Based on the available spatial information, we know that room 304 has eight direct neighbors {403, 404, 405, 303, 305, 203, 204, 205}. We now scan the clusters in the neighbor set of Cx for their highest association with room 403. In this case, we found 0.2% to be the highest value. We continue this operation for all the other neighboring rooms of 304 by again scanning for the maximum association value with each room. This process is repeated for the other two rooms, namely 708 and 206. By computing the arithmetic mean values of the maximum neighbor associations for the three hypotheses, we see that cluster Cx when associated with room 708 is very well aligned with the other neighbors. Unlike the hypothesis that cluster Cx might be associated with either room 304 and 206 that needs to be discarded as the spatial information does not align well with the observed from the collected data stream.

To update this information neatly into the CR-matrix, we post an artificial iterative data point into the equation. We set the event status for cluster Cx and clear the event status for all other clusters. We further state room 708 to contain the active predicate while all the other rooms clearing the predicate. When then define an a-priori heuristic where we state that the default likelihood of an event to occur for a room with the predicate set is 99% and the default likelihood of the event to not occur in a room with the predicate cleared is 1%. Running these a-priori heuristics through the algorithm as outlined in FIG. 4 and then update the CR-matrix, the Cx/RID=708 field will have a near 100% probability while all the other room fields in the row of Cx, and all the other clusters of the RID=708 column, will be set to near 0%. This operation will create a hard link between the cluster Cx and room 708.

The described solutions allow an operation of the system in a self-healing manner. Once the likelihood of a cluster to be associated with a room is above a certain acceptance threshold, we can assume a hard link. If we have a hard link between a cluster and a room, then all logging information should be tagged as belonging to the room and control data from the server directed towards the room should be dutifully executed. However, as the system operates, the process to monitor the cluster association with its room needs to continue. Should the correlation weaken and eventually fall below a specific failure threshold, the hard link between the cluster and the room should be relinquished. At this point, data logging can continue but should not be associated with the room any longer. It should be treated at this point as an orphaned cluster that might belong to a number of rooms. Control commands to rooms without a hard-linked cluster should not be forwarded as there is too much risk that the command my end up in an incorrect room.

The status if a room has a hard link with a cluster should be visualized on an operator terminal serviced from the server. If a room has no hard-linked cluster, it would be possible to accelerate the binding for this room by instructing the staff member to go to the room and perform a specific and somewhat unique operation. For example, if we have two rooms, 102 and 203 that have no cluster, the system could instruct to go to room 102 and press the thermostat ON/OFF button five times. Once such an event is received, the cluster that transmitted this event can be associated with room 102 and it should free up that the sole remaining unassigned cluster can now be associated with room 203. However, these manual assists should not often be required as in a well-maintained system, a sufficient amount of correlating data exists and because of the high degree of maintenance state, all other hard linked associations form a tremendous force in the process by exclusion.

Figure 9:
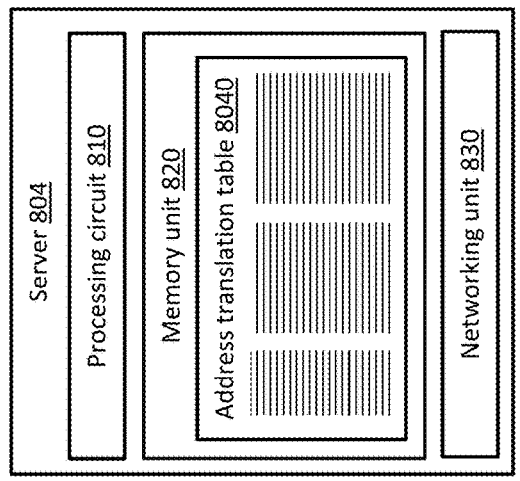
FIG. 9 is a schematic illustration of a server of the automation system of FIG. 8 in accordance with embodiments.
Figure 10:
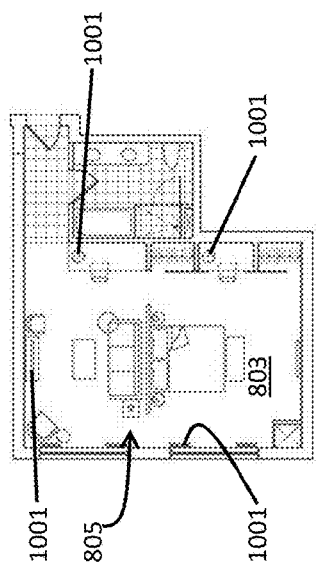
FIG. 10 is a top down plan view of a room in the building of FIG. 8 in which an electronic device cluster is disposed in accordance with embodiments.
Figure 8:
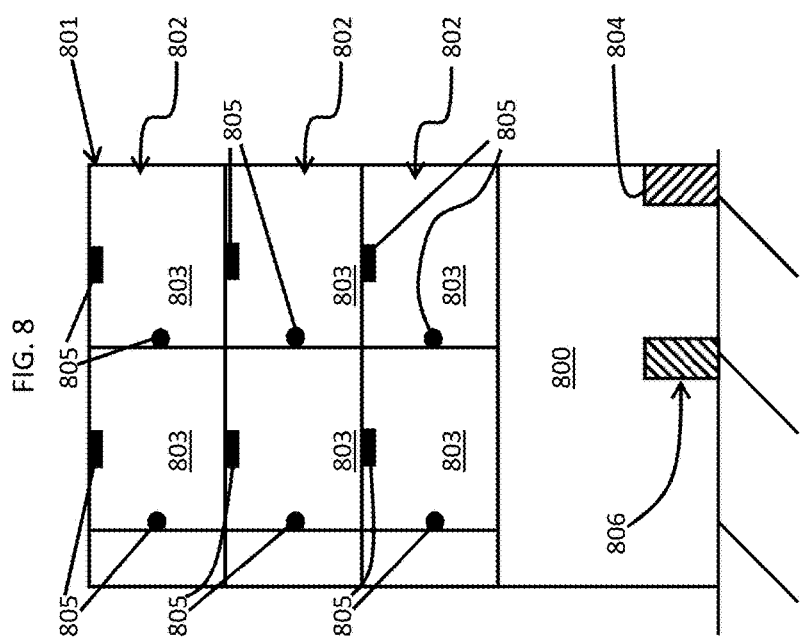
FIG. 8 is a schematic illustration of a building in which an automation system is deployed in accordance with embodiments.

With reference to FIGS. 8-10, an automation system 800 is provided for deployment in a building 801 with multiple floors 802 and multiple rooms 803 on each of the multiple floors 802. In accordance with embodiments, the building 801 may be configured as a hotel, a dormitory, a senior living facility, a hospital, an office building, etc. As shown in FIGS. 8 and 10, the automation system 800 includes computing resources or a server 804 (hereinafter referred to as "server 804") as well as an electronic device cluster 805 that is installed in or otherwise resides in each of the multiple rooms 803 and, in some cases, a property management system 806. In accordance with embodiments, the server 804 may be disposed within the building 801 or may be disposed remotely with respect to the building 801. However, for purposes of clarity and brevity, the illustration in FIG. 8 and the following description will relate to the case of the server 804 being disposed within the building 801.

As shown in FIG. 9, the server 804 includes a processing circuit 810, a memory unit 820 and a networking unit 830. The processing circuit 810 may be provided as a microprocessor or another suitable processing element. The networking unit 830 permits communications between the processing circuit 810 and the electronic device cluster 805 in each of the multiple rooms 803 and the property management system 806. The memory unit 820 has executable instructions stored thereon which are executable by the processing circuit 810. When executed, the executable instructions cause the processing circuit 810 to operate as described herein.

As shown in FIG. 10, each electronic device cluster 805 in each room 803 includes electronic devices 1001. The electronic devices 1001 may be provided as one or more of light switches, thermostats, dimmer controllers, drapery controllers, motion sensors and other sensors. At least one of the electronic devices 1001 is configured to sense a condition within the room 803. At least one of the electronic devices 1001 is configured to report sensing results to the server 804 which, at least at an initial time does not know or recognize where the electronic device clusters 805 are located (as will be described below, room locations of the electronic device clusters 805 are undefined for the server 804 at the initial time). In accordance with embodiments, multiple electronic devices 1001 may be configured to sense one or more conditions within the room 803 and multiple electronic devices 1001 may be configured to report one or more sensing results to the server 804. In some cases, one or more electronic devices 1001 may be configured to sense one or more conditions within the room 803 and to report one or more sensing results to the server 804. In those cases, where one or more of the electronic devices 1001 is reliant upon another one or more of the electronic devices 1001 for reporting to the server 804, the electronic devices 1001 may be communicative with each other. In any case, the processing circuit 810 of the server 804 is receptive of the sensing results from the at least one electronic device 1001 in each electronic device cluster 805 in each room 803 and external information from the property management system 806 for example by way of the networking unit 830.

In accordance with embodiments, the sensed condition may include at least one of an occupancy state of the room 803, a lighting condition within the room 803, an environmental condition within the room 803, energy usage within the room 803, water usage within the room 803, audio/visual purchases within the room 803 and minibar consumption within the room 803. In accordance with further embodiments, the external information may include at least one of a type of the room 803, a rental state of the room 803 and a characteristic of an individual associated with the room 803.

Figure 11:
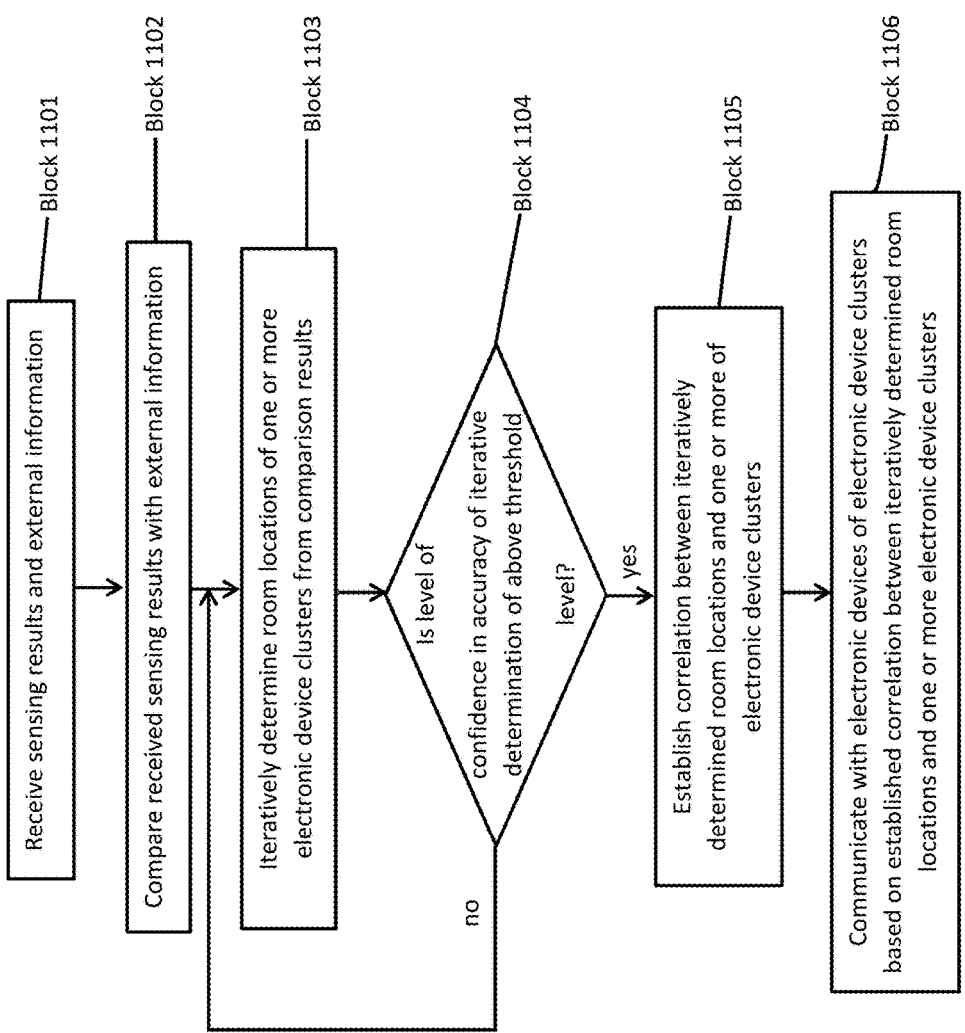
FIG. 11 is a flow diagram illustration an operation of an automation system in accordance with embodiments.

With reference to FIG. 11, the processing circuit 810 of the server 804 is receptive of the sensing results from the at least one electronic device 1001 in each electronic device cluster 805 in each room 803 and external information from the property management system 806 for example by way of the networking unit 830 (block 1101). The processing circuit 810 and thus the server 804 is further configured to compare the received sensing results with the external information (block 1102) and to iteratively determine room locations of one or more of the electronic device clusters 805 from comparison results (block 1103). At this point, the processing circuit 810 determines whether a level of confidence in the accuracy of the iterative determination of block 1103 is above a threshold level (block 1104) and continues the iterative determining of block 1103 if it is not above that threshold level. On the other hand, if the processing circuit 810 determines that the level of confidence is above the threshold level, the processing circuit 810 establishes a correlation between the iteratively determined room locations and the one or more of the electronic device clusters 805 (block 1105) and thereafter communicates with at least one of the electronic devices of the one or more of the electronic device clusters based on iteratively determined room locations or, more particularly, the established correlation between the iteratively determined room locations and the one or more of the electronic device clusters 805 (block 1106).

The processing circuit 810 can be located at the server 804 onsite in the Cloud or can alternatively be in a distributed form performed by the electronic device clusters 805. In the latter case, the processing circuit 810 may be provided over the network with sufficient external information to perform the correlation functions.

In accordance with embodiments, room locations of the electronic device clusters 805 are undefined for the server 804 at an initial time and the processing circuit 810 iteratively determines over time the room locations based on at least one correlation between the sensing results and the external information. The processing circuit 810 does this by executing the methods and algorithms described herein. For example, where the sensed condition is a lighting condition within the room 803 and minibar consumption within the room 803 and the reported sensing results indicate that only one room 803 exhibited lighting condition manipulation and minibar purchases on a day when the external information indicated that only that one room 803 had guests, the processing circuit 810 determines that the cluster of electronic devices 805 from which the reported sensing results originated from is in actuality the one room 803 with the guests. Thereafter, the processing circuit 810 generates an address translation table 8040 (see FIG. 9), which is storable in the memory unit 820 and which serves to correlate iteratively determined room locations (e.g., the room number the guests stayed in) with logical addresses of the electronic devices 1001 of the one or more of the electronic device clusters 805.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An automation system for deployment in a building with rooms, the automation system comprising:
   a server; and
   an electronic device cluster in each room, each electronic device cluster comprising electronic devices of which at least one is configured to sense a condition within the room and at least one of which is configured to report sensing results to the server,
   wherein room locations of the electronic device clusters are undefined for the server at an initial time and the server is receptive of the sensing results from the at least one electronic device in each electronic device cluster in each room and external information and is configured to:
   compare the received sensing results with the external information,
   iteratively determine the room locations of one or more of the electronic device clusters from comparison results based on a correlation between the sensing results and the external information, and
   communicate with at least one of the electronic devices of the one or more of the electronic device clusters based on iteratively determined room locations.

2. The automation system according to claim 1, wherein the sensed condition comprises an occupancy state of the room, a lighting condition within the room, an environmental condition within the room, energy usage within the room, water usage within the room, audio/visual purchases within the room and minibar consumption within the room.

3. The automation system according to claim 1, wherein the external information comprises a type of the room, a rental state of the room, and a characteristic of an individual associated with the room.

4. The automation system according to claim 1, wherein the server executes iterative determination of the room locations by generating an address translation table correlating iteratively determined room locations with logical addresses of the electronic devices of the one or more of the electronic device clusters.

* * * * *